United States Patent [19]

Dauvergne

[11] 4,414,883

[45] * Nov. 15, 1983

[54] POWER-ASSISTED STEERING DEVICE

[76] Inventor: Jean L. R. Dauvergne, 6 rue Maryse Hilsz, 95470 Fosses, France

[*] Notice: The portion of the term of this patent subsequent to Mar. 10, 1998 has been disclaimed.

[21] Appl. No.: 117,483

[22] Filed: Feb. 1, 1980

[30] Foreign Application Priority Data

Feb. 8, 1979 [EP] European Pat. Off. ........ 79400085.1

[51] Int. Cl.³ .............................................. F15B 9/12
[52] U.S. Cl. ................................... 91/467; 91/375 A;
137/625.21; 180/148
[58] Field of Search ................. 91/375 A, 375 R, 467;
137/625.21, 596; 180/148; 251/283

[56] References Cited

U.S. PATENT DOCUMENTS

| 323,144 | 7/1885 | Henneboehle | 137/625.21 |
|---|---|---|---|
| 2,988,059 | 6/1961 | Wysong, Jr. | 91/375 A |
| 3,227,178 | 1/1966 | Elwell | 137/625.21 |
| 3,696,710 | 10/1972 | Ortelli | 137/625.21 X |
| 4,232,708 | 11/1980 | Miller | 137/625.21 |
| 4,254,691 | 3/1981 | Dauvergne | 91/467 |

Primary Examiner—Gerald A. Michalsky
Attorney, Agent, or Firm—Young & Thompson

[57] ABSTRACT

The invention relates to a power-assisted steering device for a vehicle, of the kind comprising a steering wheel and steering column coupled to a steering device such as a rack and pinion arrangement, the auxiliary assisting means being hydraulically operated and including a hydraulic cylinder acting on the rack. The steering column comprises two parts which are capable of limited angular displacement in response to steering movements, and the assisting device has a fluid distributor which is sensitive to this angular displacement. This distributor comprises an axially-stacked assembly having a first stator, a first rotor plate integral in rotation with one of the two parts of the steering column, a second rotor plate integral in rotation with the other part of the steering column, and a second stator, the rotor plates having a series of hydraulic passages for feed and return of the pressurized hydraulic fluid. In order to eliminate or reduce axial thrust of the plates and stators resulting from pressure differentials occurring during operation, according to the invention at least one pressure balancing or equilibration channel is provided in at least one of the rotors. This eliminates the need for thrust bearings in the assembly and thereby reduces the cost of the device.

5 Claims, 19 Drawing Figures

POWER-ASSISTED STEERING DEVICE

BACKGROUND OF THE INVENTION

The present invention relates to a power-assisted steering device for a vehicle, which comprises control means acting on steering means, the said control means having a transmission element such as a steering column comprising two parts which are capable of limited relative angular displacement under the action of the said control means, and auxiliary means which, in response to this angular displacement, act on the steering means in the same direction as the control means. In this device, the said auxiliary means comprise a hydraulic power system having means for pressurising a liquid and a reservoir, a hydraulic actuator acting on the said steering means, and a hydraulic distributor interposed between the power system and the actuator, the said distributor comprising an axially-stacked assembly composed of a first stator, a first rotor plate integral in rotation with one of the two parts of the transmission element, a second rotor plate integral in rotation with the other part of the transmission element, and a second stator, the said rotor plates having a series of hydraulic passages for feeding and returning the hydraulic fluid to and from the actuator by the power system via the stators.

In general, the fluid pressures in the hydraulic distributors in such power-assisted steering devices for vehicles are not in equilibrium, and as a result they have a large axial thrust, particularly when the pressure of the power system is high; this thrust is generally taken up by some form of bearing. This bearing increases the cost of the installation.

The present invention provides a device for the power-assisted steering of a vehicle, in which total or partial hydraulic equilibrium of the pressures is achieved, which makes it possible to omit the above-mentioned bearing.

SUMMARY

According to the invention, a deice of the kind described above is characterised in that at least one pressure balancing or pressure-equilibrating channel, in which no liquid circulates, is additionally provided in at least one of the rotors and emerges through at least one of the faces of this rotor in an occluded region of the rotor or stator wall adjacent to this face.

By virtue of this arrangement, the hydraulic pressure existing in the distributor is utilised in order to achieve a hydrostatic equilibrium using a simple and inexpensive construction which does not contain bearings.

In a preferred embodiment, the equilibration channel emerges, through one face of the rotor, in an occluded region of the adjacent rotor or stator wall, and, through the other face, in means for return to the reservoir, whilst, as a variant, this channel advantageously emerges in occluded regions through both faces of the rotor.

In other variants, the equilibration channel emerges, through one face of the rotor, in an occluded region of the adjacent rotor or stator wall, and, through the other face, in means for pressurising a liquid in the power system or in means for communicating with the actuator.

According to another characteristic, the equilibration channels are independent of the fluid passages in the rotors.

It should be noted that the equilibration channels can be provided either in only one of the rotors or in both rotors.

BRIEF DESCRIPTION OF THE DRAWINGS

FIG. 9 illustrates the interface between the first rotor of FIG. 5 and the second rotor of FIG. 6;

DESCRIPTION OF THE PREFERRED EMBODIMENTS

In the embodiment shown in FIGS. 1 to 10, a power-assisted steering device according to the invention is illustrated by way of example applied to a motor vehicle.

The device comprises (FIG. 1) control means 10 which act on steering means such as drag links 11. The control means 10 comprise a steering wheel 12 and a steering column 13. The latter comprises two aligned parts 13A and 13B, which are provided with limited relative play permitting an angular displacement between the parts 13A and 13B under the action of the control means 10. The part 13A is integral with the steering wheel 12, whilst the part 13B is integral with a pinion 14 which engages with a rack 15. The latter determines the orientation of front wheels 16 of the vehicle via drag links 11.

An auxiliary hydraulic power system 17-18 comprises a reservoir 17 and means for pressurising a liquid, such as a pump 18, drawing from this reservoir 17. A hydraulic actuator 19, which consists of a jack in the example shown, has a piston 20 (FIG. 3), the rod 21 of which acts on the rack 15. The piston 20 defines two chambers 22 and 23 in the actuator 19.

A hydraulic distributor 24 is interposed between the pump 18 and the actuator 19 and is sensitive to the angular displacement of the two parts 13A and 13B so as to cause the actuator 19 to act on the drag links 11 in the same direction as the control means.

The distributor 24 comprises an axially stacked assembly (FIGS. 2 and 3) composed of a first stator 25, a first rotor plate 26 integral in rotation with the part 13A of the steering column, a second rotor plate 27 integral in rotation with the part 13B of the steering column, and a second stator 28.

The first rotor plate 26 is thicker than the plate 27. It possesses a grooved central hole 29 which is engaged, without angular play, on a grooved bearing 30 on the part 13A, and is engaged, with angular play, on a grooved bearing 31 on the part 13B. The other plate 27 has a grooved central hole 32 which is engaged, without play, on the grooves 31 on the part 13B.

It is the play between the grooves 29 and 31 which defines the limited relative angular play mentioned above. This play ammounts to a few degrees either side of a mean rest position which tends to be restored and maintained by means of a torsion bar 33 which elastically couples the parts 13A and 13B.

An annular groove 34 (FIGS. 2, 3 and 4) is provided on the face 35 of the stator 25, which is adjacent the plate 26. This plate 26 (FIG. 5) possesses a circular series of passages 36 (three in the example shown) which are distributed over the same mean radius as the groove 34, so as to straddle the latter (FIG. 8), and which extend from one face of the plate 26 to the other. This annular groove 34 (FIG. 3) is connected to the pump 18 via a passage 37.

The face 38 of the second stator 28, which is adjacent to the second plate 27 (FIGS. 3 and 7), possesses two concentric annular grooves 39 and 40, which are respectively connected to the two chambers 22 and 23 of the actuator 19 via passages 41 and 42. The second plate 27 (FIG. 6) possesses two circular series of passages 43 and 44 respectively.

The passages 43 of the first series (three in the example shown) are distributed over the same mean radius as the groove 39, so as to straddle the latter (FIG. 10), and extend from one face of the plate 27 to the other, whilst the passages 44 of the second series (three in the example shown) are distributed over the same mean radius as the groove 40, so as to straddle the latter (FIG. 10), and extend from one face of the plate 27 to the other.

The first plate 26 (FIG. 5) possesses a series of external peripheral slots 45 and a series of internal peripheral slots 46. The purpose of these slots 45 and 46 is to permit hydraulic fluid to return to the reservoir 17 (FIG. 3) via a passage 47 in the stator 25, and a passage 48.

Figure 1:
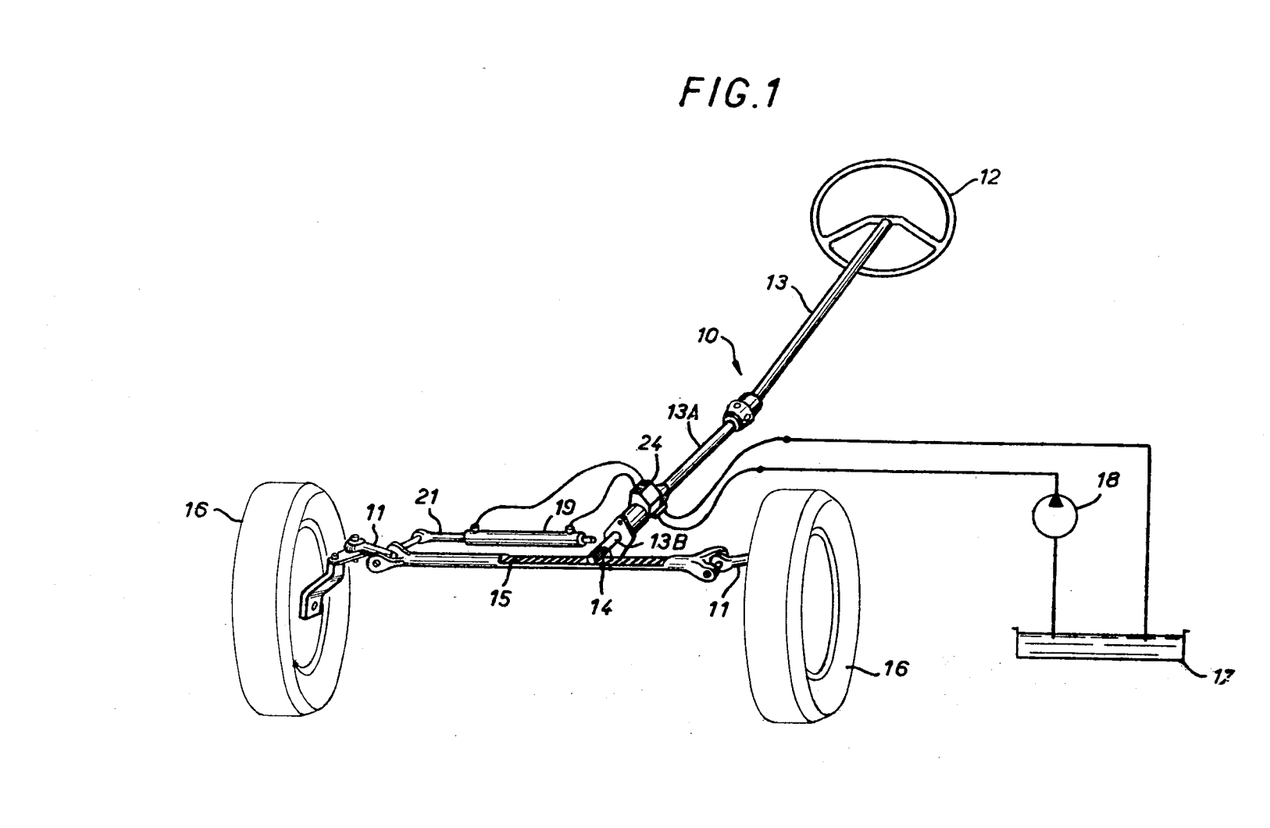
FIG. 1 is a schematic view, in perspective, of a power-assisted steering device for a motor vehicle, according to the invention.
Figure 2:
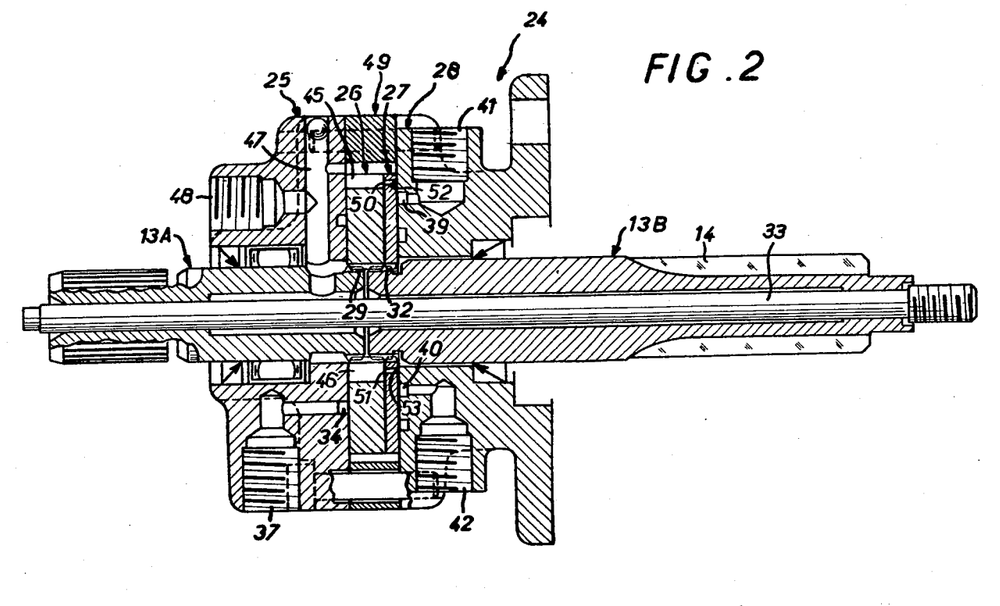
FIG. 2 is a view of this device, on a larger scale, in longitudinal section along the broken line II—II of FIG. 9, and showing in particular the equilibration channels.
Figure 3:
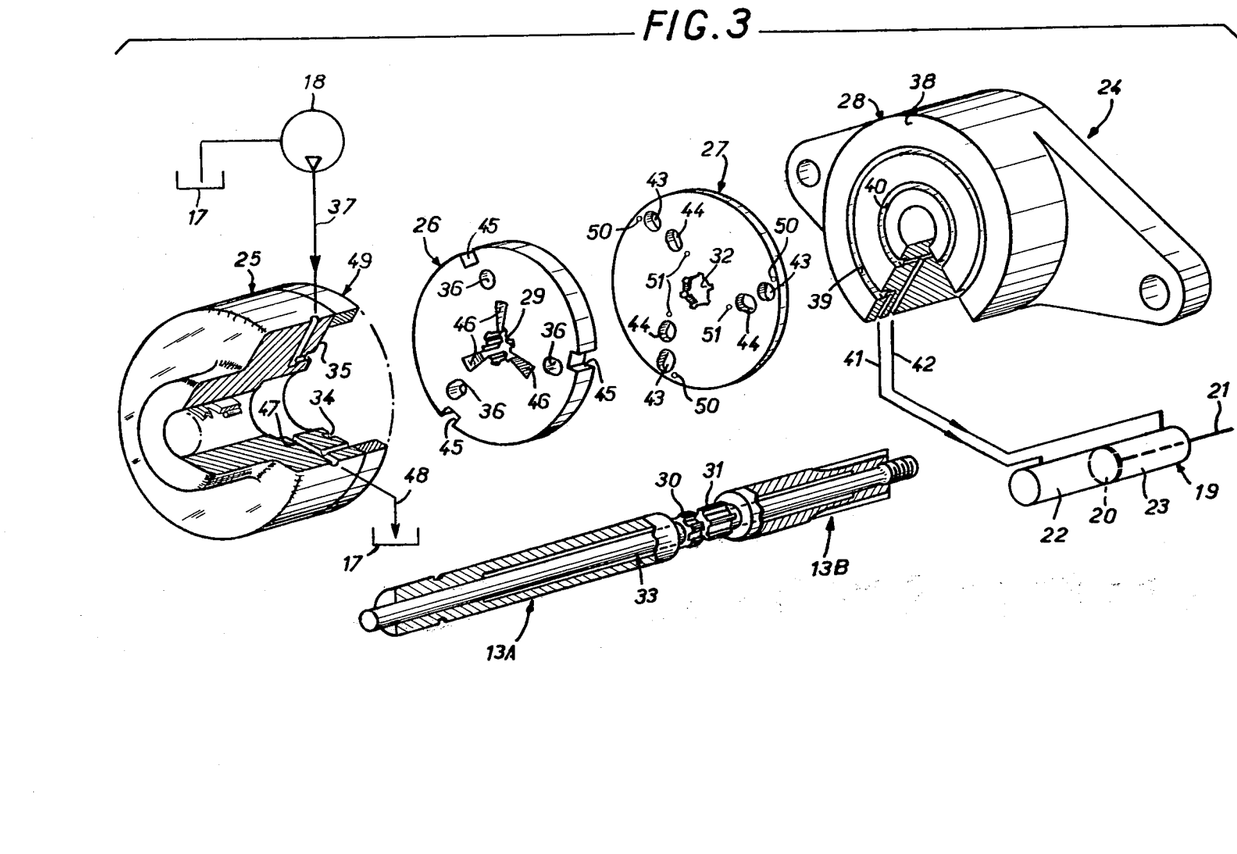
FIG. 3 is a schematic view of the device, in exploded perspective, showing the two stators and the two rotors and also part of the steering column.
Figure 4:
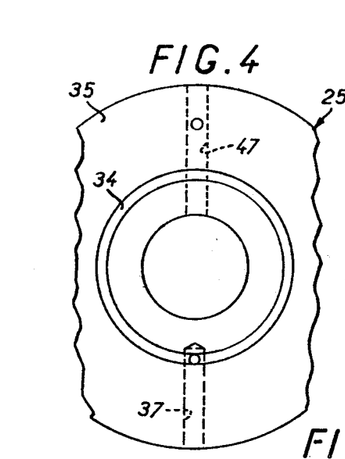
FIG. 4 is a view of that face of the first stator which is adjacent to the first rotor.
Figure 5:
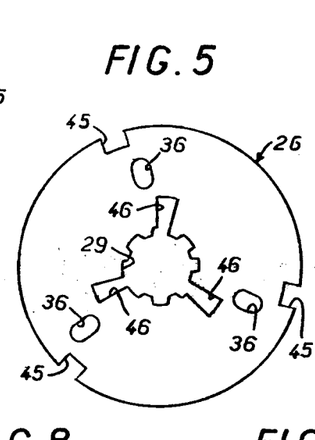
FIG. 5 is a view of the first rotor in elevation.
Figure 6:
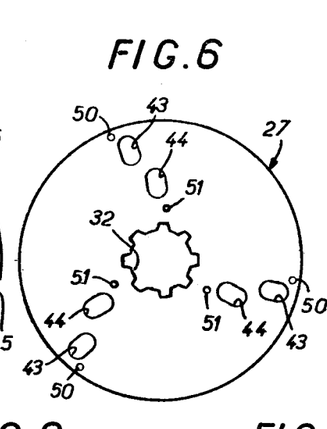
FIG. 6 is a view of the second rotor in elevation.
Figure 7:
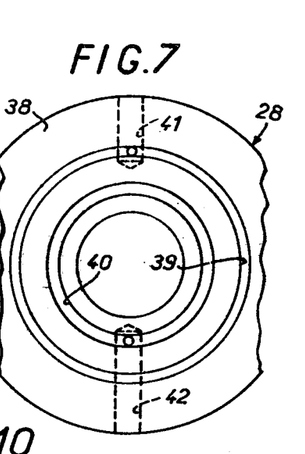
FIG. 7 is a view of that face of the second stator which is adjacent to the second rotor.

FIGS. 2 and 3 show an annular spacer 49 which joins the stators 25 and 28 and surrounds the rotors 26 and 27.

According to the invention, pressure-equilibrating or pressure balancing channels 50, 51, in which no liquid circulates, are provided in at least one of the rotors (the rotor 27 in the example shown in FIGS. 1 to 10) for maintaining a pressure equilibrium.

The channels 50 emerge (FIG. 2), through the right-hand face of the rotor 27 in an occluded region 52 of the stator 28, that is to say a region with no outlet (a solid wall in the example shown), and, through the left-hand face of the rotor 27, in the slots 45 in the plate 26 for return to the reservoir 17.

The channels 51 also emerge (FIG. 2), through the right-hand face of the rotor 27, in an occluded region 53 of the stator 28, (a solid wall in the example shown), and, through the left-hand face of the rotor 27, in slots 46 in the plate 26 for return to the reservoir 17.

The equilibration channels 50 and 51 are independent of the circulation passages 43 and 44.

By virtue of the channels 50 and 51, total or partial equilibrium of the pressures is achieved and this makes it possible to avoid the use of bearings for taking up an axial thrust.

Figure 8:
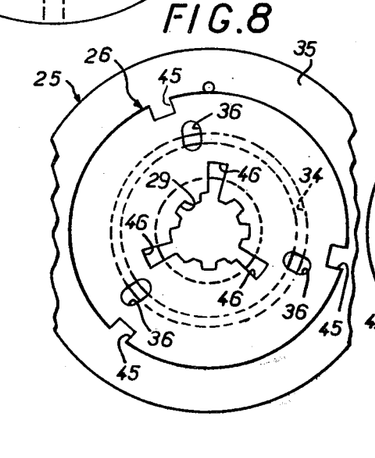
FIG. 8 illustrates the interface between the first stator of FIG. 4 and the first rotor of FIG. 5.
Figure 10:
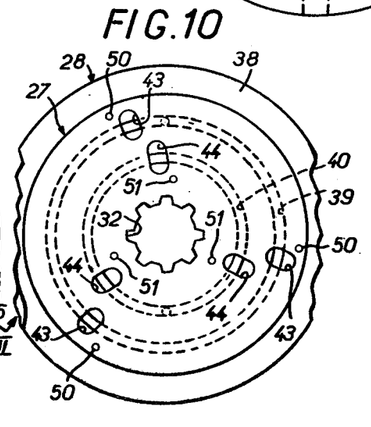
FIG. 10 illustrates the interface between the second rotor of FIG. 6 and the second stator of FIG. 7.

If the driver does not turn the steering wheel 12, the parts 13A and 13B are kept in the rest position by means of the torsion bar 33. FIGS. 8, 9 and 10 show how the various passages and grooves are then arranged, relative to one another, over the three interfaces. The output of the pump 18 is admitted through the passage 37 into the groove 34 (FIG. 8), reaches the passages 36, regardless of the angular position of the rotor plate 26, and from there (FIG. 9), reaches the passages 43 and 44 which are themselves connected to the slots 45 and 46 for return to the reservoir 17 via the passage 47 and the passage 48. The pressure of the pump thus has no effect in the two chambers 22 and 23 of the actuator 19. The installation thus operates with an open centre and there is no action on the actuator 19.

If the driver turns the steering wheel 12 in order to steer the wheels 16, the parts 13A and 13B are displaced, relative to one another, in a direction determined by this action on the steering wheel 12, and the relative angular position of the two plates 26 and 27 changes, for example, from the rest position in FIG. 9 to a position in which the passages 43 overlap more with the passages 36 and less with the slots 45, whilst the passages 44 overlap less with the passages 36 and more with the slots 46.

Under these conditions, the output of the pump, passing from the groove 34 into the passages 36, is preferentially admitted though the passages 43 into the groove 39, and from there, into the chamber 22 of the actuator 19. The volume of the said chamber increases by pushing the rod 21 in the direction desired for steering. The volume of the chamber 23 of the actuator 19 decreases and the oil from the chamber is driven through the passage 42 into the groove 40 and into the passages 44 which communicate with the slots 46 for return to the reservoir 17 via the passage 47 and the passage 48.

If the driver turns the steering wheel 12 in the other direction, operation is the same as that which has now been described, but the plate 27 assumes an angular position, relative to the plate 26, which is displaced in the other direction, relative to the rest position in FIG. 9. The output of the pump passes via 34, 36, 44, 40 and 42 into the chamber 23 of the actuator 19, and the return of the oil from the chamber 22 to the reservoir 17 takes place via 41, 39, 43, 45, 47 and 48.

In the event of failure of the auxiliary means, the action on the steering wheel 12 for the purpose of steering has the effect of taking up the limited relative angular play between the parts 13A and 13B, in the teeth 29, 30, 31, 32, by overcoming the elastic resistance opposed by the torsion bar 33, and subsequently, by virtue of the rigid connection produced by the thick disc 26 which straddles the teeth 30 and 31, of causing the part 13B to rotate with the part 13A, thus ensuring steering.

More particularly, the simple and effective construction of the device according to the invention, with equilibrium achieved by virtue of the channels 50 and 51, will be appreciated.

In the embodiment shown in FIGS. 1 to 10, the equilibration channels 50, 51 provided in one of the two rotors, namely the rotor 27 (FIG. 2), emerge, through one of the faces of the latter, in occluded regions 52, 53, and, through the other face, in means 45, 46 for return to the reservoir 17.

Figure 11:
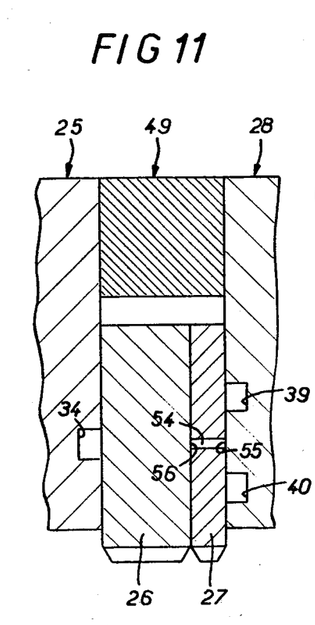
FIGS. 11, 12, 13 and 14 are views similar to part of FIG. 2, on a larger scale, but respectively showing four variants of the arrangement of the equilibration channels.

As a variant (FIG. 11), the equilibration channels designated by 54, which are provided in the rotor 27, emerge, through both faces of the latter, in occluded regions 55 and 56 of the stator 28 and of the rotor 26.

Figure 12:
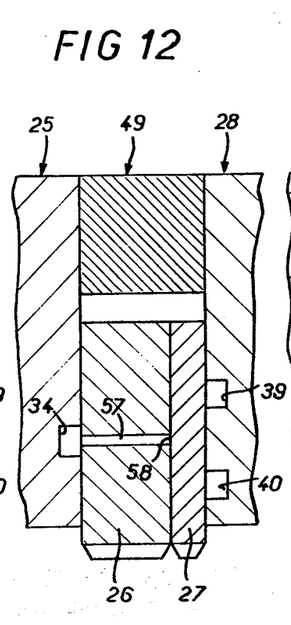

In another variant (FIG. 12), the equilibration channels designated by 57 are provided in the rotor 26 and emerge, through one of the faces of the latter, in an occluded region 58 of the rotor 27, and, through the other face, in the groove 34 in the stator 25, which groove is connected to the pump 18.

Figure 13:
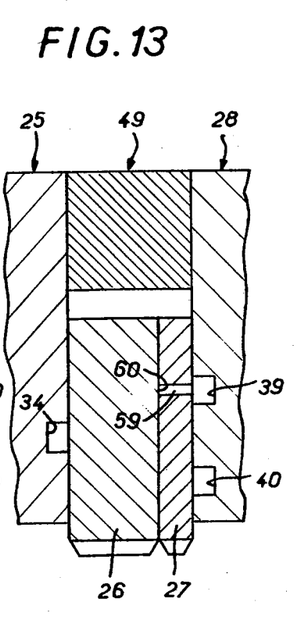

In another variant (FIG. 13), the equilibration channels designated by 59 are provided in the rotor 27 and emerge, through one of the faces of the latter, in an occluded region 60 of the rotor 26, and, through the other face, in one of the grooves 39, 40 (the grooves 39 in the example shown) connected to the actuator 19.

Figure 14:
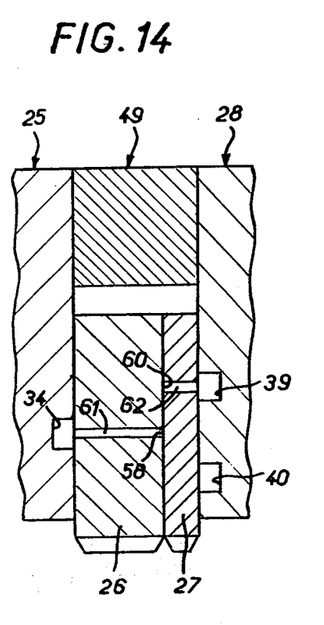

In another variant (FIG. 14), the equilibration channels designated by 61 and 62 are provided in both the rotors 26 and 27. The channels 61 provided in the rotor 26 are similar to the channels 57 in FIG. 12 and emerge, through the faces of the rotor 26, in the occluded region 58 and in the groove 34, whilst the channels 62 provided in the rotor 27 are equivalent to the channels 59 in FIG. 13 and emerge, through the faces of the rotor 27, in the occluded region 60 and in the grooves 39.

Reference will now be made to FIGS. 15 to 19, in which the arrangement is still similar to that described with reference to FIGS. 1 to 10, but in which the circulation passages and slots in the rotors 26 and 27 have been modified and, at least in some cases, are provided with steps.

On the face adjacent to the rotor 27, the circulation passages in the rotor 26, which are designated by 36', cover a wide Z-shaped area and emerge, through a small hole 70, on the face adjacent to the stator 25, opposite the groove 34.

45' and 46' show the slots in the rotor 26 for return to the reservoir 17. The slots 45' only cover part of the thickness of the rotor 26, namely the part adjacent to the rotor 27, and open out directly on the periphery of the rotor 26. The slots 46' only cover part of the thickness of the rotor 26, namely the part adjacent to the stator 25, and open out in the central space in the rotor 26 and emerge on the face adjacent to the rotor 27 through oblong holes 71.

On the face adjacent to the rotor 26, the circulation passages in the rotor 27, which are designated by 43' and 44', have a curved shape centered on the axis of the distributor and emerge, through small holes 72 and 73, on the face adjacent to the stator 28, opposite the grooves 39 and 40.

Figure 15:
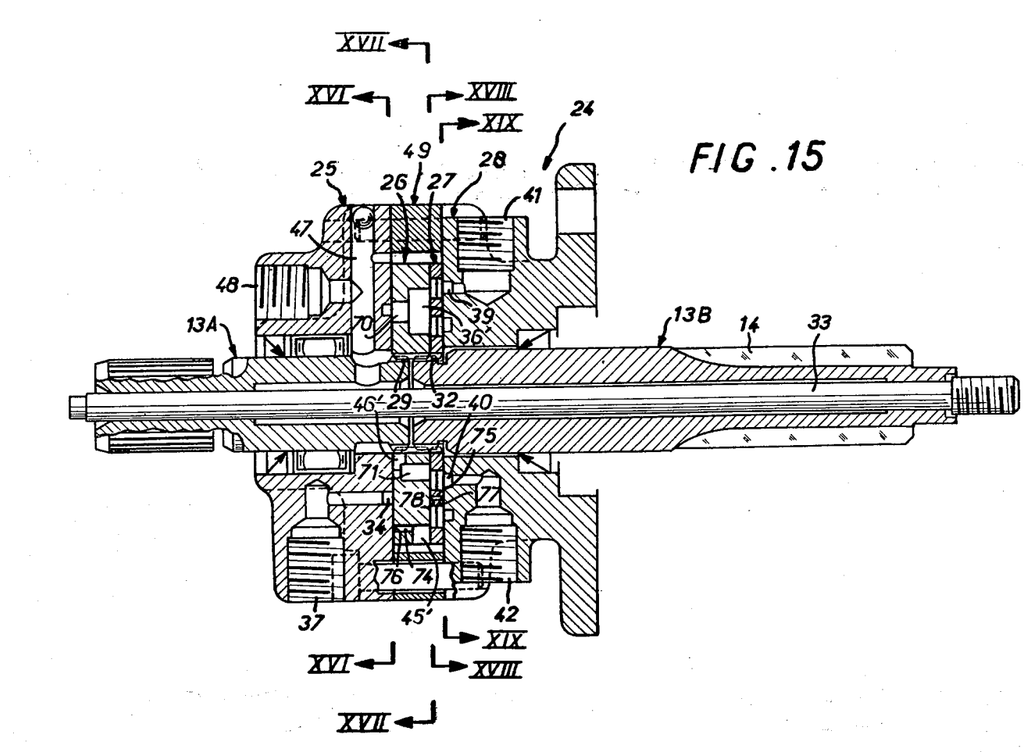
FIG. 15 is a general view similar to that of FIG. 2, but relating to a further variant.
Figure 16:
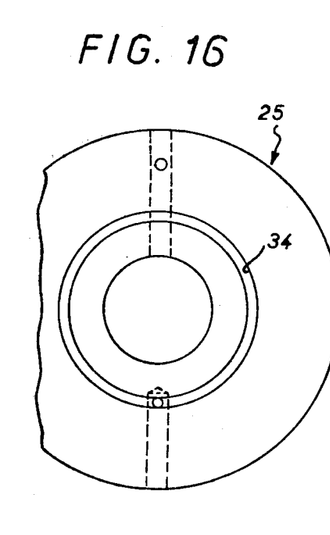
FIGS. 16, 17, 18 and 19 are corresponding views, respectively in the direction of the arrows XVI—XVI, the arrows XVII—XVII, the arrows XVIII—XVIII and the arrows XIX—XIX of FIG. 15.
Figure 17:
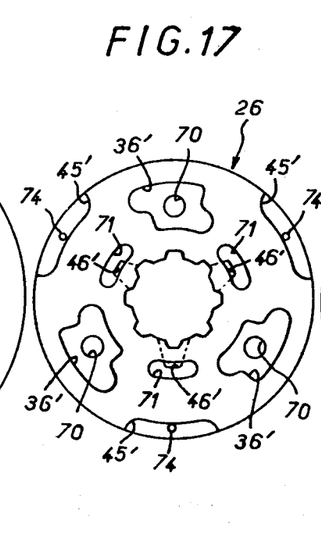
Figure 18:
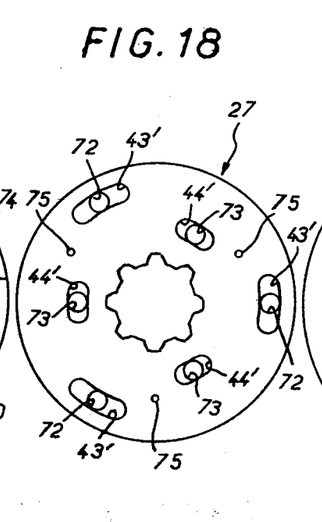
Figure 19:
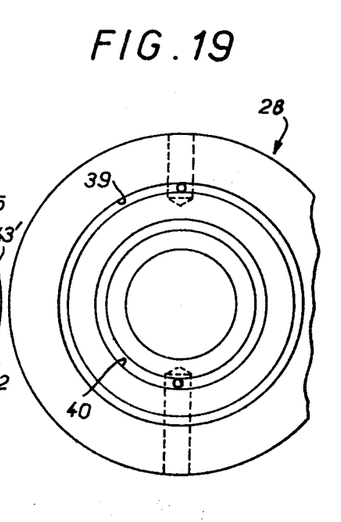

In FIGS. 15, 17 and 18, the pressure-equilibrating channels are shown by 74 and 75.

The channels 74 are provided in the rotor 26 and emerge, through the left-hand face of the latter (FIG. 15), in an occluded region 76 of the stator 25 (such as a solid wall, as shown, or a groove with no outlet) and emerge on the right-hand side in any suitable hydraulic passages, such as the slots 45', for return to the reservoir 17.

The channels 75 are provided in the rotor 27 and emerge, through both faces of the latter, in occluded regions 77 and 78 of the stator 28 and of the rotor 26.

The operation of the device described with reference to FIGS. 15 to 19 is similar to that of the device described with reference to FIGS. 1 to 10.

It should be noted that the equilibration channels can consist of cylindrical holes, as shown, or they can have any other shape, for example a stepped shape.

I claim:

1. In a power-assisted steering device for a vehicle, comprising control means acting on steering means, said control means incorporating a transmission element in two parts which parts are capable of limited relative angular displacement under the action of the said control means, and auxiliary assistance means operable to act on the steering means in the same direction as the control means in response to said relative angular displacement, the said auxiliary assistance means comprising a hydraulic power system including means for pressurizing a hydraulic fluid and a fluid reservoir, a hydraulic actuator acting on the said steering means, and a hydraulic distributor interposed between the power system and the actuator, the said distributor comprising an axially-stacked assembly composed of a first stator, a first rotor plate integral in rotation with one of said two parts of the transmission element, a second rotor plate integral in rotation with the other said part of the transmission element, and a second stator, said assembly comprising said first stator, said first rotor, said second rotor and said second stator stacked in side-by-side relationship with their side faces contiguous to each other, the said rotor plates having a series of hydraulic passages for feeding and returning fluid to and from the actuator by the power system via the stators; the improvement comprising at least one pressure-equilibrating channel, in which no liquid circulates, in at least one of the rotors, said channel emerging through at least one of the faces of this rotor in an occluded region of at least one of the adjacent faces of the rotor and stator that are on opposite sides of said at least one rotor.

2. A device according to claim 1, wherein the equilibration channel emerges through the other face of its said rotor, in return means to the reservoir.

3. A device according to claim 1, wherein the equilibration channel provided in at least one of the rotors emerges, through both faces of its said rotor, in occluded regions of the rotor and stator faces adjacent to the said faces of its said rotor.

4. A device according to claim 1, wherein the said equilibration channel is spaced from said passages.

5. A device according to claim 1, wherein a said equilibration channel is provided in both rotors.

* * * * *